US012344336B2

(12) United States Patent
Chi et al.

(10) Patent No.: US 12,344,336 B2
(45) Date of Patent: Jul. 1, 2025

(54) LEG ASSEMBLY AND DEVICE FOR ROBOT

(71) Applicant: Tencent Technology (Shenzhen) Company Limited, Shenzhen (CN)

(72) Inventors: Wanchao Chi, Shenzhen (CN); Yu Zheng, Shenzhen (CN); Yuan Dai, Shenzhen (CN); Kun Xiong, Shenzhen (CN); Xiangyu Chen, Shenzhen (CN); Qinqin Zhou, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 683 days.

(21) Appl. No.: 17/743,982

(22) Filed: May 13, 2022

(65) Prior Publication Data

US 2022/0266448 A1 Aug. 25, 2022

Related U.S. Application Data

(63) Continuation of application No. PCT/CN2021/084746, filed on Mar. 31, 2021.

(30) Foreign Application Priority Data

Aug. 11, 2020 (CN) .......................... 202010802986.X

(51) Int. Cl.
*B62D 57/032* (2006.01)
(52) U.S. Cl.
CPC ................... *B62D 57/032* (2013.01)
(58) Field of Classification Search
CPC .................................................. B62D 57/032
See application file for complete search history.

(56) References Cited

U.S. PATENT DOCUMENTS 6,243,623 B1 6/2001 Takenaka et al.
7,145,305 B2 * 12/2006 Takenaka ............. B62D 57/032
901/1

(Continued)

FOREIGN PATENT DOCUMENTS

CN 101835569 A 9/2010
CN 202413981 U 9/2012

(Continued)

OTHER PUBLICATIONS

Tencent Technology, ISR, PCT/CN2021/084746, Jul. 5, 2021, 2 pgs.

(Continued)

*Primary Examiner* — Kevin Hurley
(74) *Attorney, Agent, or Firm* — Morgan, Lewis & Bockius LLP

(57) ABSTRACT

This application relates to a leg assembly and device for a robot. The leg assembly includes: a connection assembly and a sole assembly; the connection assembly is configured to connect the leg assembly and a robot body. The sole assembly includes a sole plate, a first force sensor, a distance sensor, and an attitude sensor. The connection assembly includes a second force sensor and a shank connector. The first force sensor is configured to detect a normal reaction force suffered by the sole plate after being in contact with an obstacle; the second force sensor is configured to detect a resultant force of reaction forces suffered by the sole plate after being in contact with the obstacle.

20 Claims, 6 Drawing Sheets

(56) References Cited

U.S. PATENT DOCUMENTS

| | | | |
|---|---|---|---|
| 7,664,572 | B2 | 2/2010 | Takenaka et al. |
| 7,881,824 | B2 * | 2/2011 | Nagasaka ............... B25J 13/088 |
| | | | 700/250 |
| 2005/0049748 | A1 | 3/2005 | Lee et al. |
| 2005/0107916 | A1 | 5/2005 | Nagasaka |

FOREIGN PATENT DOCUMENTS

| | | | |
|---|---|---|---|
| CN | 103204190 A | | 7/2013 |
| CN | 105015641 A | | 11/2015 |
| CN | 105564528 A | | 5/2016 |
| CN | 104434470 B | * | 1/2017 |
| CN | 106828657 A | | 6/2017 |
| CN | 108216420 A | | 6/2018 |
| CN | 108706060 A | | 10/2018 |
| CN | 108714889 A | | 10/2018 |
| CN | 108974172 A | | 12/2018 |
| CN | 109606500 A | | 4/2019 |
| CN | 111924020 A | | 11/2020 |
| JP | 2004142095 A | | 5/2004 |
| JP | 2013208294 A | | 10/2013 |
| WO | WO 2020113262 A1 | | 6/2020 |

OTHER PUBLICATIONS

Tencent Technology, WO, PCT/CN2021/084746, Jul. 5, 2021, 5 pgs.

Tencent Technology, IPRP, PCT/CN2021/084746, Feb, 7, 2023, 6 pgs.

Tencent Technology, Extended European Search Report and Supplementary Search Report, EP21855100.0, Jan. 4, 2023, 11 pgs.

Giorgio Valsecchi et al., "Quadrupedal Locomotion on Uneven Terrain with Sensorized Feet", IEEE Robotics and Automation Letters, IEEE, vol. 5, No. 2, Jan. 23, 2020, XP011770716, 8 pgs.

* cited by examiner

LEG ASSEMBLY AND DEVICE FOR ROBOT

CROSS-REFERENCE TO RELATED APPLICATIONS

This application is a continuation application of PCT Patent Application No. PCT/CN2021/084746, entitled "LEG ASSEMBLY AND DEVICE FOR ROBOT" filed on Mar. 31, 2021, which claims priority to Chinese Patent Application No. 202010802986.X, filed with the State Intellectual Property Office of the People's Republic of China on Aug. 11, 2020, and entitled "LEG ASSEMBLY AND DEVICE FOR ROBOT", all of which are incorporated herein by reference in their entirety.

BACKGROUND OF THE DISCLOSURE

At present, increasingly more legged robots are designed and applied in daily life. In a process of designing the legged robots, it is necessary to consider how to control the legged robots to achieve normal walking and moving in different environments, to solve the problem of unstable walking and moving of the legged robots that is caused by an unknown environment.

In the related art, a pressure sensor is installed on a foot of a legged robot, to sense the magnitude and direction of pressure contacted by the foot of the legged robot, and a walking mode of the legged robot is adjusted according to the detected pressure information, for example, a stride or a walking direction is adjusted, to realize normal walking of the legged robot in some unknown environments.

However, in a process of practically applying the solutions in the related art, there is a problem that the legged robot cannot be controlled to move normally in some unknown environments by adjusting foot postures because the legged robot has less perception information about the environment, thus limiting application scenarios of the legged robot.

SUMMARY

This application provides a leg assembly and device for a robot. The technical solutions are as follows.

In an aspect, a leg assembly for a robot is provided, the leg assembly includes: a connection assembly and a sole assembly. The connection assembly is configured to connect the leg assembly and a robot body.

The sole assembly includes a sole plate, a first force sensor, a distance sensor, and an attitude sensor.

The connection assembly includes a second force sensor and a shank connector.

The first force sensor, the distance sensor, the attitude sensor, and the second force sensor are each electrically connected to a control unit.

The first force sensor is configured to detect a normal reaction force suffered by the sole plate 1201 after being in contact with an obstacle.

The distance sensor is configured to detect a real-time distance between the sole plate 1201 and the obstacle.

The attitude sensor is configured to detect a spatial orientation of the sole plate; and The second force sensor is configured to detect a resultant force of reaction forces suffered by the sole plate after being in contact with the obstacle.

In some embodiments, the sole assembly and the connection assembly are connected by using a joint assembly; the joint assembly includes a joint ball socket, a ball joint, and an elastic assembly; and the sole plate is configured to drive, in response to a reaction force from a contact surface, the joint ball socket to rotate with three degrees of freedom relative to the ball joint, so as to adapt to fitting the contact surface.

In a possible implementation, the elastic assembly includes a conical return spring;

the conical return spring is configured to be in a passively compressed state when the sole plate is in contact with the obstacle; and the conical return spring is further configured to release stored energy when the sole plate is separated from the obstacle, so as to drive the sole plate to restore to an initial state.

In a possible implementation, the joint ball socket is a joint ball socket with a limiting structure; and front and rear edges of the joint ball socket with the limiting structure are designed into low edge positions, and left and right edges of the joint ball socket with the limiting structure are designed into high edge positions.

In a possible implementation, the sole plate is a metal structure with a void or a groove; and connection wires of the first force sensor, the distance sensor, and the attitude sensor with the control unit are connected to the control unit through the void or the groove on the metal structure.

In a possible implementation, a bottom and an outer side of the metal structure are cladded with sole rubber.

In some embodiments, the first force sensor is an ionic thin-film force sensor; the ionic thin-film force sensor is located between the sole rubber and the bottom of the metal structure; and the ionic thin-film force sensor is distributed in a ring shape.

In some embodiments, the distance sensor is a thin-film distance sensor; the thin-film distance sensor is located in a middle area between the sole rubber and the bottom of the metal structure; and a thickness of the sole rubber corresponding to a lower part of the thin-film distance sensor is smaller than a thickness of the sole rubber at another position.

In a possible implementation, the attitude sensor is disposed in the groove of the metal structure.

In a possible implementation, the elastic assembly includes a conical return spring; the conical return spring is disposed on (e.g., sleeved on) a periphery of the ball joint; and a lower end of the conical return spring is connected to the sole plate 1201, and an upper end is connected to the shank connector.

In a possible implementation, the shank connector is a hollow triangular prism connector; and a lower end of the shank connector is connected to the second force sensor by using a flange.

In some implementations, the attitude sensor is an inertial measurement unit (IMU).

In some embodiments, the second force sensor is a six-axis force sensor.

In some embodiments, the control unit is set in the robot body.

In another aspect, a leg device for a robot is provided, the device including:

a robot body and the leg assembly.

The technical solutions provided in this application may include the following beneficial effects:

In the solutions shown in the embodiments of this application, by installing a first force sensor, a distance sensor, an attitude sensor, and a second force sensor in a leg assembly for a robot, the leg assembly realizes comprehensive detection of a contact environment, and uploads detection results of the sensors to a control unit, so that the control unit comprehensively controls the robot based on the detection results of the sensors. The solutions shown in this application not only obtain a measurement result in a single aspect through detection of a single pressure sensor, but also increase types and quality of perception information in the environment obtained by the robot, so that the control unit may analyze a more comprehensive detection result, and control the robot to move through the leg assembly according to the detection result, which greatly improves a control effect on the leg assembly of the robot, thereby expanding application scenarios of a legged robot.

BRIEF DESCRIPTION OF THE DRAWINGS

The accompanying drawings herein are included in this specification and form a part of this specification, illustrate embodiments consistent with the present disclosure, and serve to explain the principles of the present disclosure together with this specification.

DESCRIPTION OF EMBODIMENTS

Figure 1:
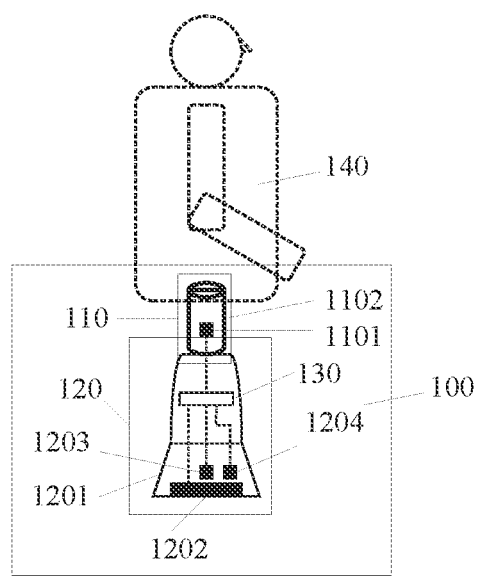
FIG. 1 is a constructional diagram of a leg assembly for a robot according to an exemplary embodiment.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of devices and methods that are described in detail in the appended claims and that are consistent with some aspects of this application.

It is to be understood that, "several" mentioned in this specification means one or more, and "plurality of" means two or more. And/or describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

For ease of understanding, several terms involved in this application are explained below.

(1) Artificial Intelligence

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. The AI software technologies mainly include several major directions such as a computer vision (CV) technology, a speech processing technology, a natural language processing technology, and machine learning/deep learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

FIG. 1 is a constructional diagram of a leg assembly for a robot according to an exemplary embodiment of this application. As shown in FIG. 1, the leg assembly 100 includes: a connection assembly 110 and a sole assembly 120, where the connection assembly 110 is configured to connect the leg assembly 100 and a robot body 140;

the sole assembly 120 includes a sole plate 1201, a first force sensor 1202, a distance sensor 1203, and an attitude sensor 1204;

the connection assembly 110 includes a second force sensor 1101 and a shank connector 1102;

the first force sensor 1202, the distance sensor 1203, the attitude sensor 1204, and the second force sensor 1101 are electrically connected to a control unit 130 respectively;

the first force sensor 1202 is configured to detect a normal reaction force suffered by the sole plate 1201 after being in contact with an obstacle;

the distance sensor 1203 is configured to detect a real-time distance between the sole plate 1201 and the obstacle;

the attitude sensor 1204 is configured to detect a spatial orientation of the sole plate 1201; and the second force sensor 1101 is configured to detect a resultant force of reaction forces suffered by the sole plate 1201 after being in contact with the obstacle.

Based on the foregoing, by installing a first force sensor, a distance sensor, an attitude sensor, and a second force sensor in a leg assembly for a robot, the leg assembly realizes comprehensive detection of a contact environment, and uploads detection results of the sensors to a control unit, so that the control unit comprehensively controls the robot based on the detection results of the sensors. The solutions shown in this application not only obtain a measurement result in a single aspect through detection of a single pressure sensor, but also increase types and quality of perception information in the environment obtained by the robot, so that the control unit may analyze a more comprehensive detection result, and control the robot to move through the leg assembly according to the detection result, which greatly improves a control effect on the leg assembly of the robot, thereby expanding application scenarios of a legged robot.

Figure 2:
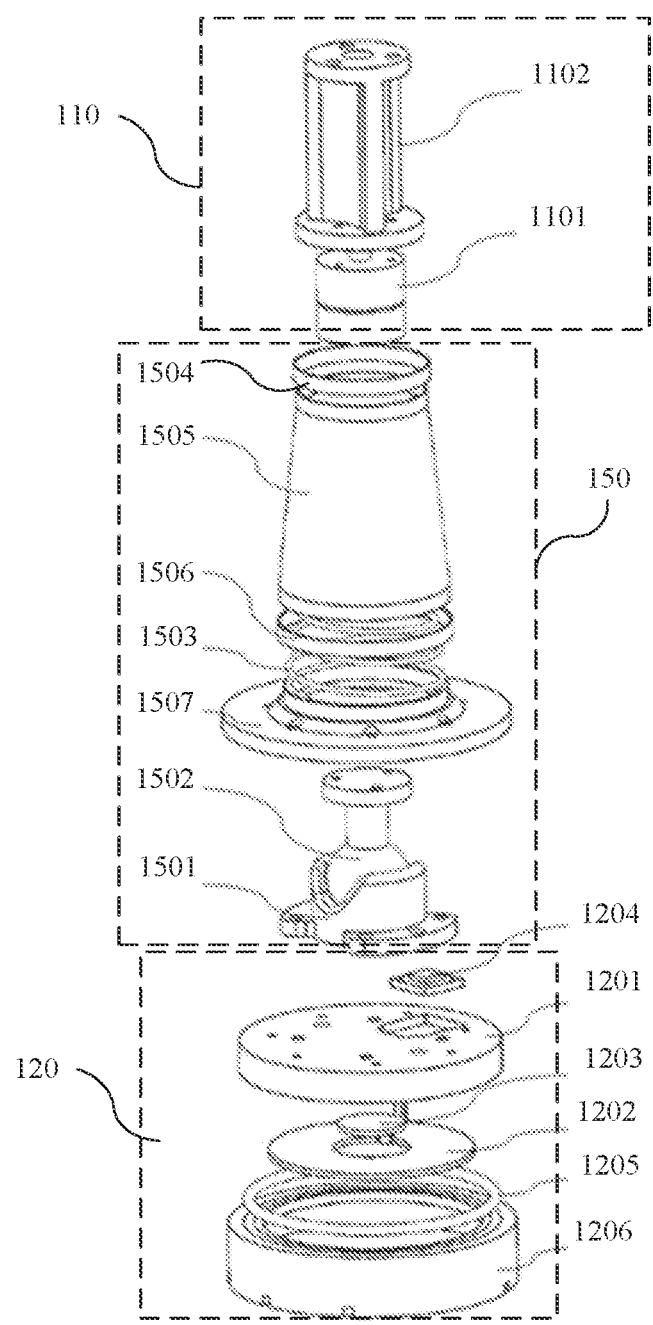
FIG. 2 is a schematic structural diagram of a leg assembly according to an exemplary embodiment.

FIG. 2 is a schematic structural diagram of a leg assembly according to an exemplary embodiment of this application. As shown in FIG. 2, the leg assembly 100 includes: a connection assembly 110 and a sole assembly 120, where the connection assembly 110 is configured to connect the leg assembly 100 and a robot body 140;

the sole assembly 120 includes a sole plate 1201, a first force sensor 1202, a distance sensor 1203, and an attitude sensor 1204;

the connection assembly 110 includes a second force sensor 1101 and a shank connector 1102;

the first force sensor 1202, the distance sensor 1203, the attitude sensor 1204, and the second force sensor 1101 are electrically connected to a control unit 130 respectively;

the first force sensor 1202 is configured to detect a normal reaction force suffered by the sole plate 1201 after being in contact with an obstacle;

the distance sensor 1203 is configured to detect a real-time distance between the sole plate 1201 and the obstacle;

the attitude sensor 1204 is configured to detect a spatial orientation of the sole plate 1201; and the second force sensor 1101 is configured to detect a resultant force of reaction forces suffered by the sole plate 1201 after being in contact with the obstacle.

In a possible implementation, the sole assembly 120 and the connection assembly 110 are connected by using a joint assembly 150.

The control unit 130 may be disposed in the leg assembly 100, or the control unit 130 may be disposed in the robot body 140.

Figure 3:
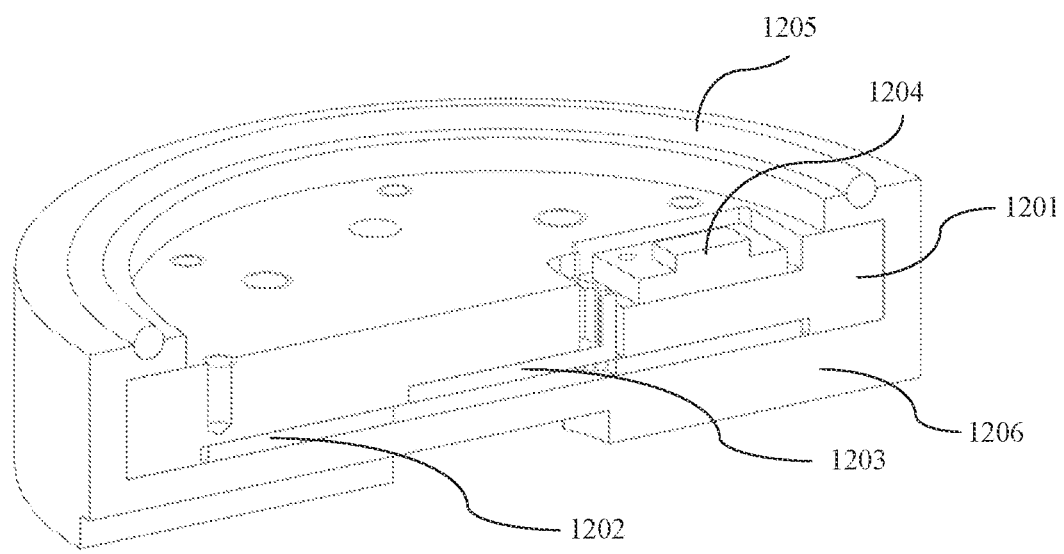
FIG. 3 is a schematic cross-sectional structural diagram of a sole assembly 120 involved in the embodiment shown in FIG. 2.

For example, FIG. 3 is a schematic cross-sectional structural diagram of a sole assembly 120 involved in an embodiment of this application. As shown in FIG. 3, the sole assembly 120 is an assembly of the robot in direct contact with the environment. Different degrees of contact between the environment and the sole assembly 120 may be reflected as reaction forces of different magnitudes and different directions generated by the environment on the sole assembly 120. In order to accurately measure an influence generated by the environment on the sole assembly 120, the sole assembly 120 needs to have a built-in sensor configured to measure information generated by the robot based on the contact with the environment. The sole assembly 120 may include: a sole plate 1201, a first force sensor 1202, a distance sensor 1203, an attitude sensor 1204, a seal ring 1205, and sole rubber 1206.

In a possible implementation, a contact surface of the sole plate 1201 and the environment is a circular plane. The circular plane may provide an isotropic contact condition, and facilitates mechanical modeling of a sole contact force based on a classical Coulomb friction cone model.

In some embodiments, the classical Coulomb friction model includes a static friction force, a coefficient of static friction, and a normal contact force.

In a possible implementation, to improve a coefficient of friction of the sole plate, provide a certain degree of buffering to an impact generated by the robot when a foot falls on the ground, and protect the sole plate 1201 at the same time, a bottom and an outer side of the sole plate 1201 are cladded with a rubber pad as the sole rubber 1206.

In a possible implementation, the first force sensor 1202 is disposed between a lower part of the sole plate 1201 and the sole rubber 1206 at the bottom.

The first force sensor 1202 may be an ionic thin-film force sensor, and is distributed between the lower part of the sole plate 1201 and the sole rubber 1206 at the bottom in a ring shape.

The ionic thin-film force sensor may measure a normal contact force between the obstacle in contact with the sole plate 1201 and the sole plate 1201.

Using the ionic thin-film force sensor may improve the accuracy of measuring the normal contact force, reduce a space occupied by the force sensor of the sole assembly 120, and further reduce a weight of the sole assembly 120.

In a possible implementation, the distance sensor 1203 is disposed between the lower part of the sole plate 1201 and the sole rubber 1206 at the bottom.

The distance sensor 1203 is located in a central area of the first force sensor 1202 distributed in a ring shape, and the distance sensor 1203 may be a thin-film distance sensor. The thin-film distance sensor may measure a distance between the sole rubber 1206 and the obstacle when the sole plate 1201 is close to or away from the obstacle in the environment.

In a possible implementation, a thickness of the sole rubber 1206 at a portion corresponding to a lower part of the thin-film distance sensor is smaller than a thickness of the sole rubber 1206 at another position of the sole assembly 120.

By reducing the thickness of the sole rubber 1206 on the lower part of the thin-film distance sensor, the thin-film distance sensor may obtain a better measurement effect and have a longer measurement distance.

Measured values of a distance between the sole rubber 1206 and the external environment and the normal contact force detected by the thin-film distance sensor and the ionic thin-film force sensor are uploaded to a control unit 130, thereby improving a control effect of the control unit 130 on the leg assembly 100.

In a possible implementation, the attitude sensor 1204 is an inertial measurement unit (IMU).

The IMU is a device configured to measure a three-axis attitude angle and an acceleration of an object.

In a possible implementation, relative attitudes of a coordinate system of the IMU and a coordinate system of the sole plate 1201 may be arbitrarily arranged, and after the arranged IMU and sole plate are calibrated, a three-axis attitude angle of the sole plate 1201 may be measured and obtained as an attitude measurement value. A spatial orientation of the sole plate 1201 is determined through the attitude measurement value.

In a possible implementation, the coordinate system of the IMU and the coordinate system of the sole plate 1201 are aligned and arranged. When an arrangement manner is to arrange the coordinate system of the IMU and the coordinate system of the sole plate, the arranged IMU and sole plate may not be necessarily calibrated, and the attitude measurement value is directly measured and obtained through the IMU.

The IMU measures Euler angles of the sole plate 1201 in a geographic absolute coordinate system. The Euler angles represent a series of three-dimensional basic rotation angles and a series of rotation angles around coordinate axes of a coordinate system. For example, an angle is first rotated around a z-axis, then the angle rotated around an x-axis, and finally the angle rotated around a y-axis. According to the measured Euler angles, the spatial orientation of the sole plate 1201 is obtained.

In a possible implementation, a shock absorbing gasket is disposed between the attitude sensor 1204 and a metal structure (the sole plate 1201), to reduce measurement interference on the attitude sensor 1204 or physical damage to the attitude sensor 1204 caused by a landing impact of the sole plate 1201.

In a possible implementation, a seal ring 1205 is configured to strengthen a connection effect with an upper cover of the sole plate.

In a possible implementation, the sole plate 1201 is a metal structure with a void or a groove; and connection wires between the first force sensor 1202, the distance sensor 1203, and the attitude sensor 1204 with the shank connector 1102 are connected to the shank connector 1102 through the void or the groove on the metal structure.

A contact surface of the sole plate 1201 and the ground may be a circular plane.

When the control unit 130 is located in the robot body 140, the connection wires may be connected to the control unit 130 in the robot body 140 through the shank connector 1102.

In a possible implementation, a bottom and an outer side of the metal structure are cladded with sole rubber 1206. That is, when the sole plate 1201 is implemented as the metal structure, the bottom and the outer side of the sole plate 1201 are cladded with the sole rubber 1206.

In a possible implementation, the first force sensor 1202 is an ionic thin-film force sensor; the ionic thin-film force sensor is located between the sole rubber 1206 and the bottom of the metal structure; and the ionic thin-film force sensor is distributed in a ring shape.

In a possible implementation, the distance sensor 1203 is a thin-film distance sensor; the thin-film distance sensor is located in a middle area between the sole rubber 1206 and the bottom of the metal structure; and a thickness of the sole rubber 1206 corresponding to a lower part of the thin-film distance sensor is smaller than a thickness of the sole rubber 1206 at another position.

In a possible implementation, the attitude sensor 1204 is disposed in the groove of the metal structure.

In a possible implementation, a shock absorbing gasket is installed between the attitude sensor 1204 and the metal structure (the sole plate 1201).

The joint assembly 150 includes a joint ball socket 1501, a ball joint 1502, an elastic assembly 1503, a lower snap ring 1506, a flexible cover 1505, and an upper snap ring 1504, and in response to a reaction force suffered by the sole plate 1201, the sole plate 1201 drives the joint ball socket 1501 to rotate with three degrees of freedom relative to the ball joint 1502, so that the sole plate 1201 adapts to fitting the contact surface.

In a possible implementation, the elastic assembly 1503 includes a conical return spring; and the conical return spring is configured to be in a passively compressed state when the sole plate 1201 is in contact with an obstacle, and release stored energy (elastic potential energy) when the sole plate is separated from the obstacle, so as to drive the sole plate 1201 to restore to an initial state.

In a possible implementation, the joint ball socket 1501 is a joint ball socket with a limiting structure; and front and rear edges of the joint ball socket with the limiting structure are designed into low edge positions, and left and right edges of the joint ball socket with the limiting structure are designed into high edge positions.

Figure 4:
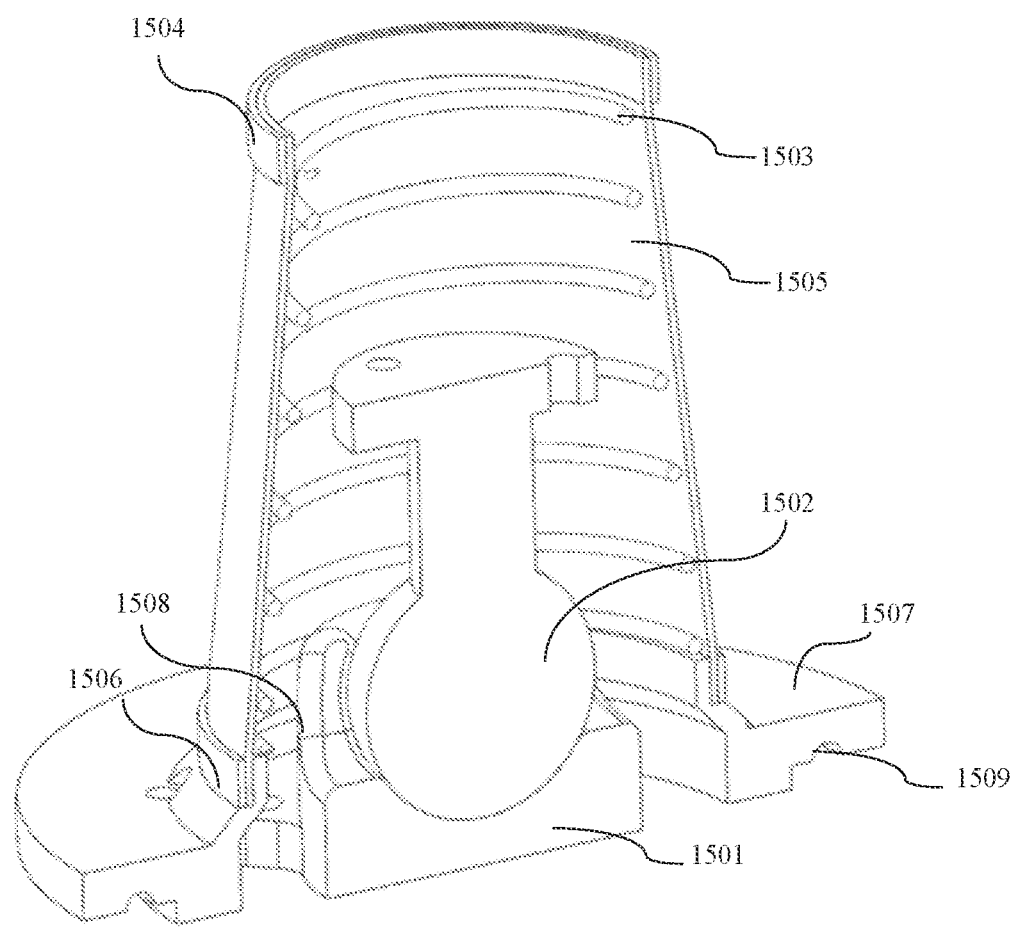
FIG. 4 is a schematic cross-sectional structural diagram of a joint assembly 150 involved in the embodiment shown in FIG. 2.

The joint assembly 150 may enable the sole assembly 120 to have a certain degree of freedom, so that the sole assembly 120 may rotate by a certain degree. For example, FIG. 4 is a schematic cross-sectional structural diagram of a joint assembly 150 involved in an embodiment of this application. As shown in FIG. 4, the joint assembly 150 may include the following: a joint ball socket 1501, a ball joint 1502, an elastic assembly 1503, an upper snap ring 1504, a flexible cover 1505, a lower snap ring 1506, an upper cover 1507 of a sole plate, a ball socket involute groove 1508, and a seal ring groove 1509.

In a possible implementation, the sole assembly 120 and the joint assembly 150 are connected by tightly fitting the seal ring groove 1509 on the upper cover 1507 of the sole plate and the seal ring 1205 in the sole assembly 120 shown in FIG. 3.

In a possible implementation, the joint ball socket 1501 may perform a rotational motion with three degrees of freedom relative to the ball joint 1502.

In a possible implementation, the joint ball socket 1501 is a joint ball socket with a limiting structure; and front and rear edges of the joint ball socket with the limiting structure are designed into low edge positions, and left and right edges of the joint ball socket with the limiting structure are designed into high edge positions.

For a degree of freedom in pitch, the joint assembly 150 expands a motion range through the front and rear low edge positions of the joint ball socket, while for a degree of freedom in roll, the joint assembly 150 maintains a relatively small motion range through the left and right high edge positions of the joint ball socket.

The part of the lower edge positions of the joint ball socket 1501 may form the ball socket involute groove 1508. When the ball socket involute groove 1508 is enlarged, the degree of freedom in pitch of the ball joint 1502 may be improved.

A ball head of the ball joint 1502 is adapted to a size of the joint ball socket 1501, to ensure connection strength between the joint ball socket 1501 and the ball head of the ball joint 1502, thereby preventing disconnection.

In a possible implementation, the sole plate 1201 is configured to drive, in response to a reaction force from a contact surface, the joint ball socket 1501 to rotate with three degrees of freedom relative to the ball joint 1502, so that the sole plate 1201 adapts to fitting the contact surface.

When the sole plate 1201 is in contact with an obstacle, the reaction force applied to the sole plate 1201 by the obstacle drives the joint ball socket 1501 to adaptively adjust an angle of a direction of the three degrees of freedom, so as to adjust an angle of an attitude angle of the connected sole plate 1201 in the direction of the three degrees of freedom, thereby adaptively adjusting a spatial orientation of the sole plate 1201.

When the sole plate 1201 is in contact with the obstacle, to enable the sole plate 1201 to adaptively realize the ability to adapt to fitting the obstacle under different contact angles, an angle adjustment of the three degrees of freedom of the joint ball socket 1501 may be performed relative to the ball joint 1502.

In a possible implementation, an encoder is disposed on the ball joint 1502, and a rotation angle of the ball joint 1502 may be directly measured through the encoder, thereby obtaining angles of attitude angles of the connected sole plate 1201.

In a possible implementation, when the sole plate 1201 is separated from the obstacle, to enable the sole plate 1201 to restore to an initial spatial orientation state, the elastic assembly 1503 is disposed in the joint assembly 150.

The elastic assembly 1503 may be a conical return spring. One end of the conical return spring is connected to the sole plate 1201, and another end is connected to the shank connector 1102.

In a possible implementation, the elastic assembly 1503 includes a conical return spring; and the conical return spring is configured to be in a passively compressed state when the sole plate 1201 is in contact with the obstacle, and release stored energy and drive the sole plate 1201 to restore to an initial state when the sole plate 1201 is separated from the obstacle.

The conical return spring is configured to be in the passively compressed state when the sole plate 1201 is in contact with the obstacle; and the conical return spring is further configured to release the stored energy (elastic potential energy) when the sole plate 1201 is separated from the obstacle, so as to drive the sole plate 1201 to restore to the initial state.

When the ball joint 1502 arbitrarily rotates with three degrees of freedom, the conical return spring is in the passively compressed state. When the sole plate is separated from the obstacle, the conical return spring releases the stored energy and drives the sole plate 1201 to restore to the initial state.

For example, when the sole plate 1201 is separated from the obstacle, the ball joint 1502 restores the angle of the direction of the three degrees of freedom to an initial angle through the conical return spring, so as to adjust the angle of the attitude angle of the connected sole plate 1201 in the direction of the three degrees of freedom to an initial angle, thereby adjusting a spatial orientation of the sole plate 1201 to restore to an initial spatial orientation.

In a possible implementation, the elastic assembly 1503 is made of an elastic cladding material;

Compared with the elastic cladding material, the conical return spring has more stable and consistent elastic performance, and has higher reliability for the return effect of the sole plate 1201.

In a possible implementation, a flexible cover 1505 is cladded on an outer side of the elastic assembly 1503.

One end of the flexible cover 1505 may be sleeved on the upper cover 1507 of the sole plate, and another end may be sleeved on the shank connector 1102.

In a possible implementation, the upper snap ring 1504 and the lower snap ring 1506 in the joint assembly 150 may be configured to fix two ends of the flexible cover 1505 on the upper cover 1507 of the sole plate and the shank connector 1102 respectively, so that the joint assembly 150 is cladded sealedly, thereby achieving purposes of dustproof and waterproof.

In a possible implementation, the elastic assembly 1503 includes a conical return spring; the conical return spring is sleeved on a periphery of the ball joint 1502; and a lower end of the conical return spring is connected to the sole plate 1201, and an upper end is connected to the shank connector 1102.

Figure 5:
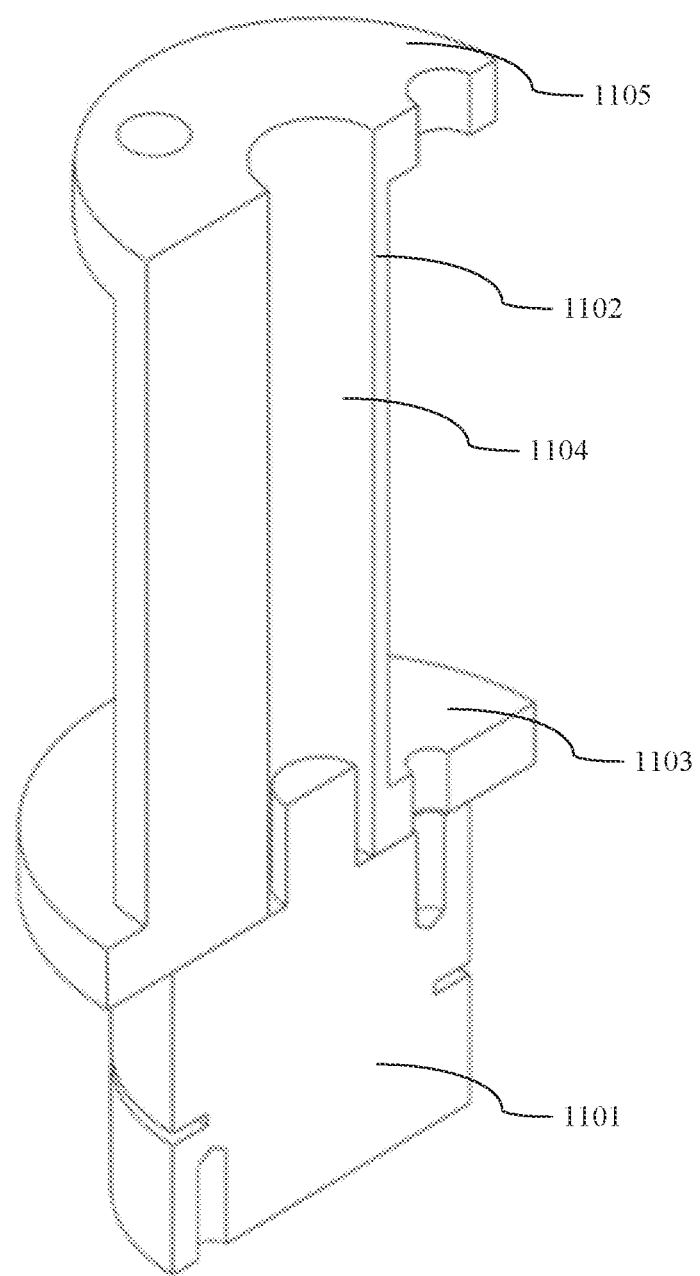
FIG. 5 is a schematic cross-sectional structural diagram of a connection assembly 110 involved in the embodiment shown in FIG. 2.

For example, FIG. 5 is a schematic cross-sectional structural diagram of a connection assembly 110 involved in an embodiment of this application. As shown in FIG. 5, the connection assembly 110 may connect a shank portion of a robot body 140 with a joint assembly 150. The connection assembly 110 may include the following, a second force sensor 1101, a shank connector 1102, a lower flange 1103, a wiring hole 1104, and an upper flange 1105.

In a possible implementation, the second force sensor 1101 is a six-axis force sensor.

The six-axis force sensor may measure a resultant force vector of reaction forces suffered by a sole plate 1201.

A front end of the six-axis force sensor may be connected to a ball head flange of a ball joint 1502, and a rear end of the six-axis force sensor may be connected to the lower flange 1103, so as to realize transmission of a force or torque.

In a possible implementation, the shank connector 1102 is a triangular prism connector.

Setting the shank connector in the shape of a triangular prism may facilitate connection between assemblies of the upper flange 1105 and the lower flange 1103.

In a possible implementation, the wiring hole 1104 is located in the shank connector.

The wiring hole 1104 may be used as an arrangement channel for connection wires, and the connection wires may be configured for a first force sensor 1202, a distance sensor 1203, an attitude sensor 1204, an encoder, and the second force sensor 1101 to upload measurement data to a control unit 130 respectively.

In a possible implementation, a flexible cover 1505 is connected to a position of the connector lower flange by using an upper snap ring, so as to achieve waterproof and dustproof protection for an entire foot of the robot.

In a possible implementation, the shank connector 1102 is a hollow triangular prism connector; and a lower end of the shank connector 1102 is connected to the second force sensor 1101 by using a flange.

In a possible implementation, the control unit 130 is disposed in the robot body 140.

Based on the foregoing, by installing a first force sensor, a distance sensor, an attitude sensor, and a second force sensor in a leg assembly for a robot, the leg assembly realizes comprehensive detection of a contact environment, and uploads detection results of the sensors to a control unit, so that the control unit comprehensively controls the robot based on the detection results of the sensors. The solutions shown in this application not only obtain a measurement result in a single aspect through detection of a single pressure sensor, but also increase types and quality of perception information in the environment obtained by the robot, so that the control unit may analyze a more comprehensive detection result, and control the robot to move through the leg assembly according to the detection result, which greatly improves a control effect on the leg assembly of the robot, thereby expanding application scenarios of a legged robot.

Figure 6:
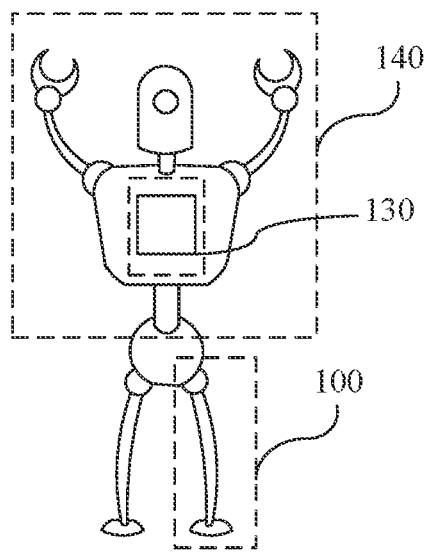
FIG. 6 is a schematic diagram of applying a leg assembly to a robot device according to an exemplary embodiment.

This application provides a leg assembly for a robot, which may be applied to different legged robots such as bipedal humanoid robots, multi-legged robots, and the like, or may be applied to ends of various series connection or parallel connection multi-joint robots, to interact with the environment. When applied to a legged robot platform as a sole, the leg assembly may adapt to a complex terrain and provide real-time effective feedback of a contact state for a control algorithm, thereby improving a balance control effect and a passing capability of the robot; when applied to a robot platform such as a robotic arm as an end executor, the leg assembly may provide rich environmental perception information for the robot, and realize an adaptive and safe contact and interaction between the robot and the environment. FIG. 6 is a schematic diagram of a leg assembly applied to a robot device according to an exemplary embodiment of this application. As shown in FIG. 6, the legged robot may be a bipedal humanoid robot, and the robot includes a robot body 140, a control unit 130, and a leg assembly 100.

The leg assembly 100 is configured to execute movement instructions, so that the robot moves according to the movement instructions.

The movement instructions may be sent by the control unit 130 to the leg assembly 100, and the movement instructions may include walking instructions and running instructions.

Different types of sensors are installed on the leg assembly 100 to detect and collect environmental information at the current moment. The leg assembly 100 and the control unit 130 are electrically connected, and the detected and collected environmental information at the current moment is uploaded to the control unit 130. The control unit 130 analyzes the environmental information, and sends the movement instructions to the leg assembly 100, to control movement of the robot at a next moment.

Based on the foregoing, by installing a first force sensor, a distance sensor, an attitude sensor, and a second force sensor in a leg assembly for a robot, the leg assembly realizes comprehensive detection of a contact environment, and uploads detection results of the sensors to a control unit, so that the control unit comprehensively controls the robot based on the detection results of the sensors. The solutions shown in this application not only obtain a measurement result in a single aspect through detection of a single pressure sensor, but also increase types and quality of perception information in the environment obtained by the robot, so that the control unit may analyze a more comprehensive detection result, and control the robot to move through the leg assembly according to the detection result, which greatly improves a control effect on the leg assembly of the robot, thereby expanding application scenarios of a legged robot.

Figure 7:
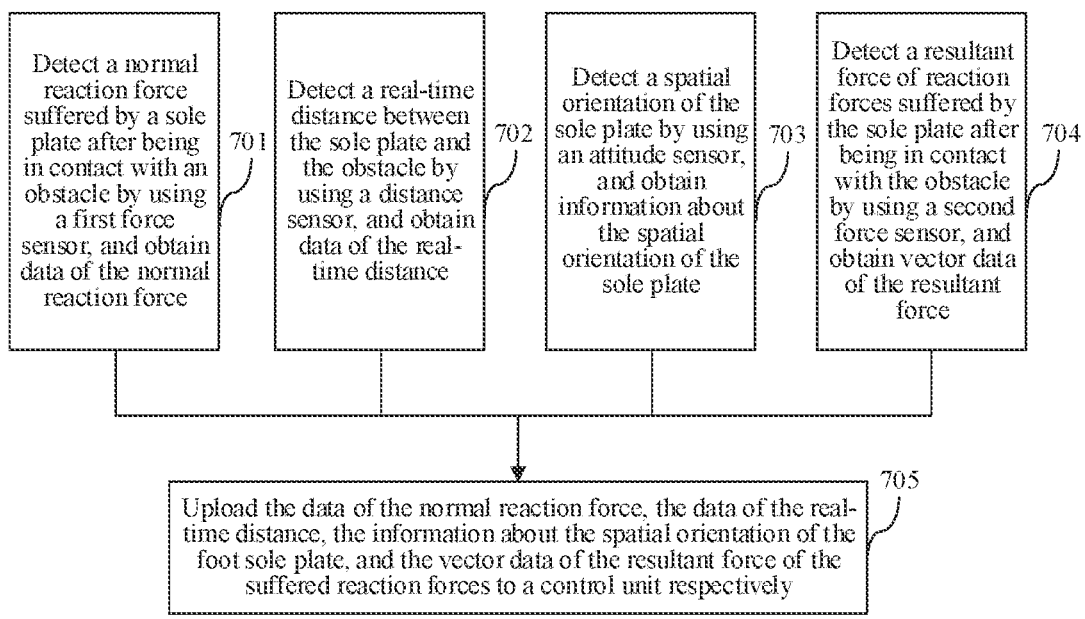
FIG. 7 is a flowchart of a method for a leg assembly for a robot to perform sensor detection according to an exemplary embodiment.

FIG. 7 is a flowchart of a method for a leg assembly for a robot to perform sensor detection according to an exemplary embodiment of this application. The method for performing sensor detection is executed by the leg assembly. As shown in FIG. 7, the method for performing sensor detection may include the following steps.

In step 701, detect a normal reaction force suffered by a sole plate after being in contact with an obstacle by using a first force sensor, and obtain data of the normal reaction force.

In step 702, detect a real-time distance between the sole plate and the obstacle by using a distance sensor, and obtain data of the real-time distance.

In step 703, detect a spatial orientation of the sole plate by using an attitude sensor, and obtain information about the spatial orientation of the sole plate.

In step 704, detect a resultant force of reaction forces suffered by the sole plate after being in contact with the obstacle by using a second force sensor, and obtain vector data of the resultant force.

In step 705, upload the data of the normal reaction force, the data of the real-time distance, the information about the spatial orientation of the sole plate, and the vector data of the resultant force of the suffered reaction forces to a control unit respectively.

In a possible implementation, the data of the normal reaction force, the data of the real-time distance, the information about the spatial orientation of the sole plate, and the vector data of the resultant force of the suffered reaction forces are obtained by real-time detection performed by the corresponding sensors in real time.

In a possible implementation, step 701, step 702, step 703, and step 704 may be performed simultaneously, or may not be performed simultaneously. Meanwhile, the control unit can perform an analysis based on at least two of the data of the normal reaction force, the data of the real-time distance, the information about the spatial orientation of the sole plate, and the vector data of the resultant force of the suffered reaction forces, so as to perceive the current environment.

Based on the foregoing, by installing a first force sensor, a distance sensor, an attitude sensor, and a second force sensor in a leg assembly for a robot, the leg assembly realizes comprehensive detection of a contact environment, and uploads detection results of the sensors to a control unit, so that the control unit comprehensively controls the robot based on the detection results of the sensors. The solutions shown in this application not only obtain a measurement result in a single aspect through detection of a single pressure sensor, but also increase types and quality of perception information in the environment obtained by the robot, so that the control unit may analyze a more comprehensive detection result, and control the robot to move through the leg assembly according to the detection result, which greatly improves a control effect on the leg assembly of the robot, thereby expanding application scenarios of a legged robot.

After considering this specification and practicing the present disclosure, a person skilled in the art may easily conceive of other implementations of this application. This application is intended to cover any variations, uses or adaptive changes of this application. Such variations, uses or adaptive changes follow the general principles of this application, and include well-known knowledge and conventional technical means in the art that are not disclosed in this application. This specification and the embodiments are considered as merely exemplary, and the real scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs movement operations for a robot. In practical application, the foregoing functions may be allocated to and completed by different functional modules according to requirements, that is, an inner structure of a device is divided into different functional modules to implement all or a part of the functions described above.

What is claimed is:

1. A leg assembly for a robot, comprising:
a sole assembly, the sole assembly comprising:
 a sole plate;
 a first force sensor, wherein the first force sensor is configured to detect a normal reaction force suffered by the sole plate after being in contact with an obstacle;
 a distance sensor, wherein the distance sensor is configured to detect a current distance between the sole plate and the obstacle; and
 an attitude sensor, wherein the attitude sensor is configured to detect a spatial orientation of the sole plate; and
a connection assembly, the connection assembly comprising:
 a second force sensor, wherein the second force sensor is configured to detect a resultant force of reaction forces suffered by the sole plate after being in contact with the obstacle; and
 a shank connector,
wherein the connection assembly is configured to connect the leg assembly with a robot body, and
wherein the first force sensor, the distance sensor, the attitude sensor, and the second force sensor are electrically connected to a control unit.

2. The leg assembly according to claim 1, wherein the sole assembly and the connection assembly are connected through a joint assembly that comprises a joint ball socket, a ball joint, and an elastic assembly, and wherein the sole plate is configured to drive, in response to a reaction force from a contact surface, the joint ball socket to rotate with up to three degrees of freedom relative to the ball joint so that the sole plate adapts to fitting the contact surface.

3. The leg assembly according to claim 2, wherein the elastic assembly comprises a conical return spring configured to be in a passively compressed state when the sole plate is in contact with the obstacle, wherein the conical return spring is further configured to release stored energy when the sole plate is separated from the obstacle, to drive the sole plate to restore to an initial state.

4. The leg assembly according to claim 2, wherein the joint ball socket is a joint ball socket with a limiting structure, and wherein front and rear edges of the joint ball socket are designed into low edge positions, and left and right edges of the joint ball socket are designed into high edge positions.

5. The leg assembly according to claim 4, wherein the joint assembly is configured to expand a motion range through the front and rear low edge positions of the joint ball socket for a degree of freedom in pitch, and the joint assembly is configured to maintain a small motion range through the left and right high edge positions of the joint ball socket for a degree of freedom in roll.

6. The leg assembly according to claim 1, wherein the sole plate is a metal structure with a void or a groove; and wherein connection wires of the first force sensor, the distance sensor, and the attitude sensor are connected to the control unit through the void or the groove in the metal structure.

7. The leg assembly according to claim 6, wherein a bottom and an outer side of the metal structure are cladded with sole rubber.

8. The leg assembly according to claim 7, wherein the first force sensor is an ionic thin-film force sensor; the ionic thin-film force sensor is located between the sole rubber and the bottom of the metal structure; and the ionic thin-film force sensor has a ring shape.

9. The leg assembly according to claim 7, wherein the distance sensor is a thin-film distance sensor located in a middle area between the sole rubber and the bottom of the metal structure; and a thickness of the sole rubber corresponding to a lower part of the thin-film distance sensor is smaller than a thickness of the sole rubber at another position.

10. The leg assembly according to claim 6, wherein the attitude sensor is disposed in the groove of the metal structure.

11. The leg assembly according to claim 2, wherein the elastic assembly comprises a conical return spring disposed on a periphery of the ball joint, and wherein a lower end of the conical return spring is connected to the sole plate, and an upper end of the conical return spring is connected to the shank connector.

12. The leg assembly according to claim 1, wherein the shank connector is a hollow triangular prism connector; and a lower end of the shank connector is connected to the second force sensor by a flange.

13. The leg assembly according to claim 1, wherein the attitude sensor is an inertial measurement unit (IMU).

14. The leg assembly according to claim 1, wherein the second force sensor is a six-axis force sensor.

15. The leg assembly according to claim 1, wherein the control unit is disposed in the robot body.

16. The leg assembly according to claim 1, wherein the control unit is configured to control the robot based on detection results of the first force sensor, the distance sensor, the attitude sensor and the second force sensor.

17. The leg assembly according to claim 1, further comprising a shock absorbing gasket disposed between the attitude sensor and the sole plate to reduce a measurement interference on the attitude sensor caused by a landing impact of the sole plate.

18. The leg assembly according to claim 2, further comprising a seal ring configured to strengthen a connection with an upper cover of the sole plate.

19. The leg assembly according to claim 18, wherein the joint assembly further comprises a flexible cover, an upper snap ring and a lower snap ring, wherein the lower snap ring is configured to fix a first end of the flexible cover on the upper cover of the sole plate and the upper snap ring is configured to fix a second end of the flexible cover on the shank connector.

20. The leg assembly according to claim 1, wherein the leg assembly is configured to execute movement instructions provided by the control unit to cause the robot to move according to the movement instructions.

* * * * *